Feb. 19, 1924.　　　　　　　　　　　　　　　　　1,484,598
F. S. WENIGER
FABRIC CUTTER
Filed July 22, 1922　　2 Sheets-Sheet 1

WITNESSES

INVENTOR
Frank S. Weniger
BY
ATTORNEYS

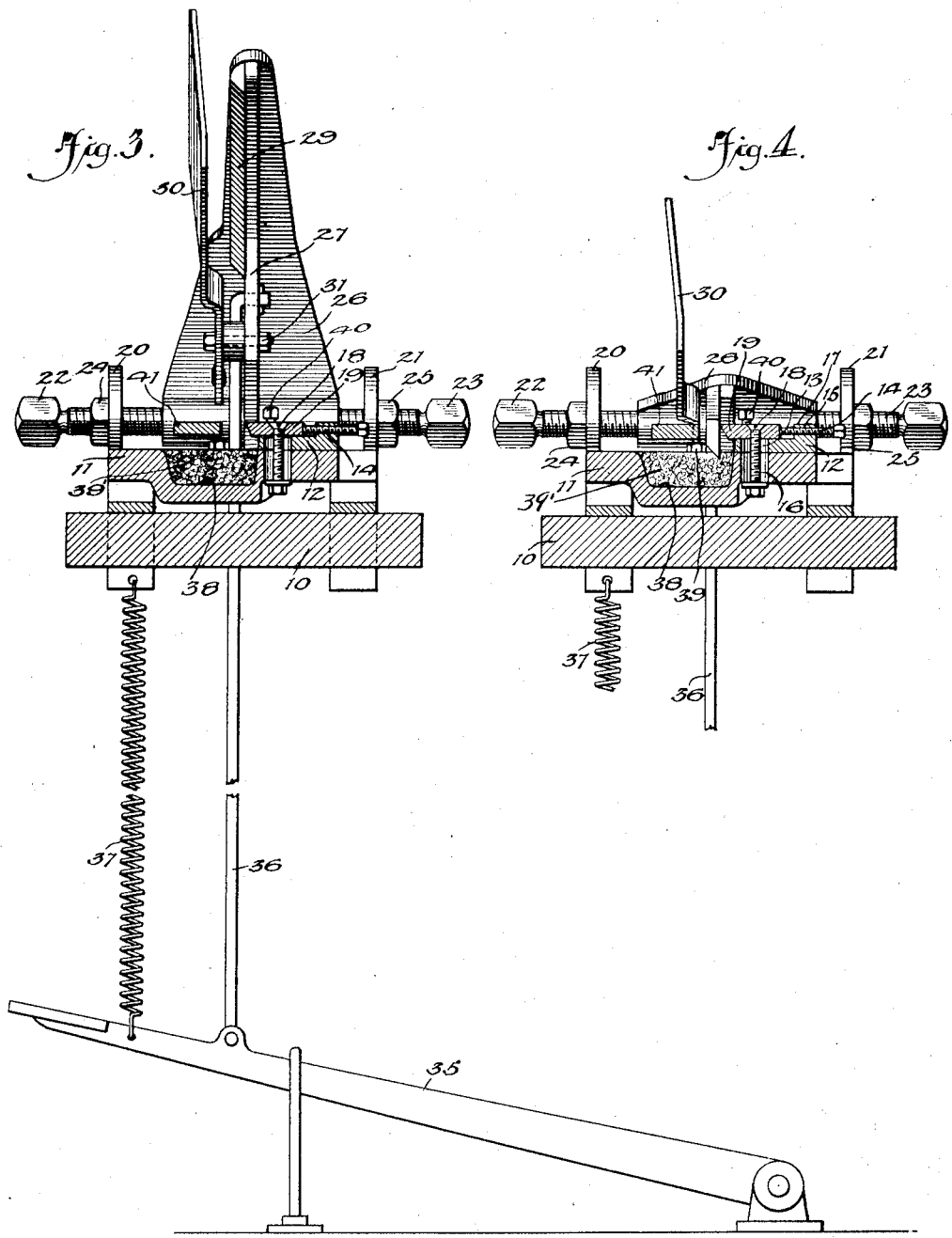

Patented Feb. 19, 1924.

1,484,598

UNITED STATES PATENT OFFICE.

FRANK S. WENIGER, OF BINGHAMTON, NEW YORK, ASSIGNOR TO PETERS BROS. RUBBER CO., OF NEW YORK, N. Y., A CORPORATION OF NEW YORK.

FABRIC CUTTER.

Application filed July 22, 1922. Serial No. 576,718.

*To all whom it may concern:*

Be it known that I, FRANK S. WENIGER, a citizen of the United States, and a resident of Binghamton, in the county of Broome and State of New York, have invented new and useful Improvements in Fabric Cutters, of which the following is a full, clear, and exact description.

This invention relates to fabric cutters and was primarily designed for use in cutting fabrics which have an adhesive coating applied.

Usually when fabrics which have an adhesive coating applied thereto are being manufactured into articles for different uses, a certain amount of difficulty is experienced in cutting the fabrics. For instance, in cutting fabrics of this type into pieces for use in the manufacture of shoe soles it is found that they stick to the cutting tool, delaying the operator's progress in the cutting process and often causing him to be inaccurate in his work.

The general object of this invention is the provision of a simple and efficient fabric cutter for cutting fabrics having adhesive coatings superimposed thereon, provided with adjustable cutting blades and means for lubricating the cutting blades so that the adhesive fabrics do not adhere thereto.

A further object of the invention is the provision of a fabric cutter for cutting adhesive cloths, provided with adjustable cutting blades which may be operated by means of a treadle or by a power drive, said movable blade being provided with a guard which moves parallel to the same.

These and other objects are accomplished by mounting on a frame an adjustable stationary blade, and a movable blade mounted for movement in a plane at right angles to the plane of the stationary blade, providing means in conjunction with the movable blade for operating it and for lubricating the blade edge so that the adhesive fabrics do not adhere thereto.

These and other objects of the invention will be more clearly understood from the following detailed description and accompanying drawings, in which—

Figure 3 is a section along the line 3—3, Figure 1, showing the movable blade in its raised position;

Figure 4 is a section along the line 3—3, Figure 1, showing the movable blade after it has been operated to cut the fabric.

Figure 1:
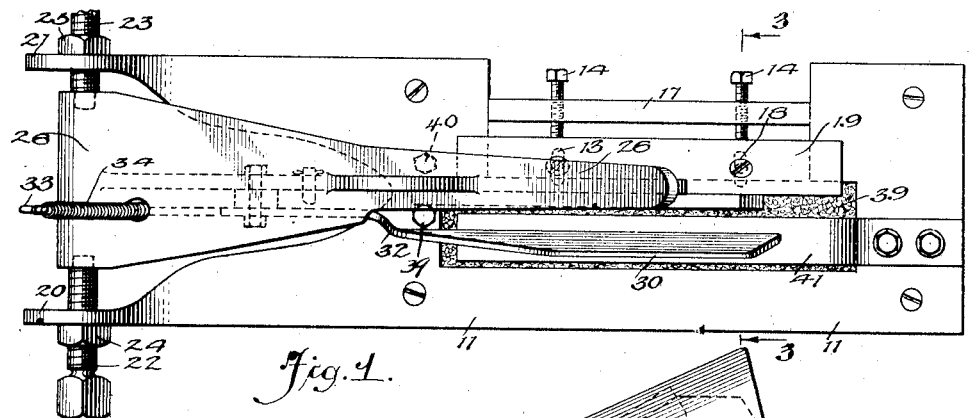
Figure 1 is a top plan view of the fabric cutter.
Figure 2:
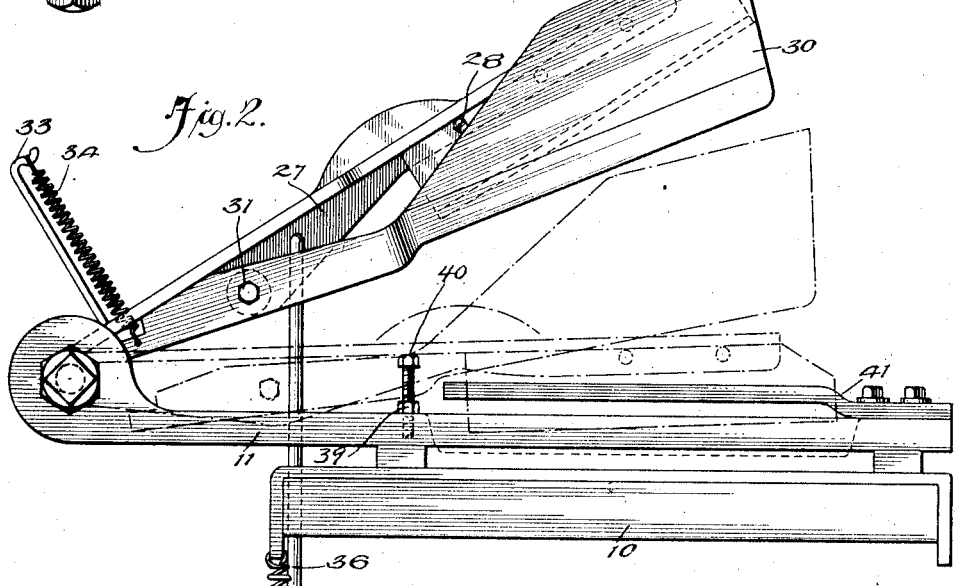
Figure 2 is a side elevation of the fabric cutter with the movable blade in its raised position.

Referring to the above-mentioned drawings, a frame 10 is shown supporting a table 11. Slots 16 are cut in the table 11 and are located near one side. Mounted on the table 11 is a plate 12 provided with slots 13 which are spaced apart a distance equal to the distance between the slots 16 and the table 11 so that when the plate 12 is located on the table the slots 13 and 16 are in alinement. The plate 12 has a flange extending upward at right angles to the table. Extending through this flange are a number of threaded openings 15 in which the set screws 14 are mounted. Mounted on the plate 12 is a cutting blade 19 which is retained in position by means of bolts 18 which extend through the cutting blade 19 and through the slots 13 and 16. The bolts 18 have screw-shaped heads which are countersunk in the blade 19. This allows the bolts to be loosened or tightened from the top. When it is desired to adjust the plate 19 the bolts 18 are loosened and by operating the set screws 14 the plate may be adjusted to any desired position carrying the bolts 18 along the slots 13 and 16. After adjusting the blade to the proper position the bolts may be tightened thus clamping the blade in position.

Extending upward from the table 11 are two lugs 20 and 21. Mounted in threaded openings provided in these lugs are two set screws 22 and 23 which may be locked in any desired position in the lugs by means of the lock nuts 24 and 25. Formed on the inner ends of the set screws 22 and 23 are bearing points upon which the movable blade frame 26 is pivotally mounted. This movable blade frame 26 has a flange 27 extending at right angles in a vertical plane. Attached to the forward end of this flange by means of screws 28 is a movable cutting blade 29. A guard 30, which is located in front of the cutting blade 29, is rotatably mounted on a bolt 31 extending through the flange 27. The front end of this guard 30 is offset from the shank at 32 so that the wide end of the guard is not located beneath the blade frame 26. In order that the guard may rotate through a certain angle about the bolt 31, the end of the shank of the guard 30 is bevelled. Attached to the blade frame 26 is a rod 33 supporting a spring 34 which is attached to the end of the shank of the guard 30, serving to rotate the guard on the bolt 31, bringing the widened end of the guard into position in front of the cutting blade when it is raised. Connected to the flange 27 of the blade frame 26 by means of the connecting rod 36 is a treadle 35 for operating the movable blade 29. A spring 37 is connected between the frame 10 and the treadle 35 for drawing it upward thus forcing the movable blade frame 26 upward on the completion of the cutting stroke.

A trough 38 is formed in the table 11 and is located in alinement with the movable blade 29, and beneath the stationary blade 19. This trough has mounted therein a felt pad 39', or some other material, which is impregnated with a lubricant such as glycerine, vaseline, grease, oil, etc. This pad being located in line with the movable blade 29 and high enough to engage the blade at the lower limit of its stroke, serves to lubricate the same with the lubricant, which prevents the sticking of the fabric to the blade.

In the operation of the fabric cutter when the movable blade frame 26 is drawn down by the operation of the treadle 35, both the blade 29 and the guard 30 move downward along parallel lines. Near the lower limit of the stroke of the blade 29 the guard 30 engages the bolt 39 and is retained from further downward movement. The blade frame continues downward until the same engages the bolt 40. On releasing the treadle 35 it is drawn upward by the spring 37 forcing the blade frame 26 upward through the connecting rod 36. As the blade frame moves upward the guard 30 is raised from the bolt 39 and is then rotated about the bolt 31 by means of the spring 34, drawing it downward in front of the blade 29.

A plate 41 is mounted on the table 11 with its upper face in alinement with the upper face of the blade 19. This plate serves to support the fabric. The offset guard 30 may be positioned at various distances from the movable cutting blade 29 so as to serve as a means for measuring the length of the fabric that is projected beneath the cutting blade.

I would state in conclusion that while the illustrated example constitutes a practical embodiment of my invention, I do not limit myself strictly to the exact details herein illustrated since manifestly the same can be considerably varied without departing from the spirit of the invention as defined in the appended claims.

Claims:

1. In a fabric cutting machine, a table, a stationary cutting blade supported thereby, a frame pivoted to one end of said table, a cutting blade carried by said frame and cooperating with said stationary blade to cut the fabric when said frame is moved about its pivot in one direction, a guard pivoted to said frame and movable therewith, and means carried by said table and with which said guard is engageable when said frame is moving in said direction for effecting a relative movement between said frame and guard during the cutting operation.

2. In a fabric cutting machine, a table, a stationary cutting blade supported thereby, a frame pivoted to one end of said table, a cutting blade carried by said frame and cooperating with said stationary blade to cut the fabric when said frame is moved about its pivot in one direction, a guard pivoted to said frame and movable therewith, and means with which said guard is engageable to stop the movement of said guard with said frame and to cause a relative movement between the guard and frame about the pivots thereof.

3. In a fabric cutting machine, a table, a stationary cutting blade supported thereby, a frame pivoted to one end of said table, a cutting blade carried by said frame and cooperating with said stationary blade to cut the fabric when said frame is moved about its pivot in one direction, a guard pivoted to said frame and movable therewith, means carried by said table and with which said guard is engageable when said frame is moving in said direction for effecting a relative movement between said frame and guard during the cutting operation, and means connecting said guard and frame for producing relative movement therebetween in an opposite direction subsequent to the cutting operation.

4. In a fabric cuting machine, a table, a stationary cutting blade supported thereby, a frame pivoted to one end of said table, a cutting blade carried by said frame and cooperating with said stationary blade to cut the fabric when said frame is moved about its pivot in one direction, a guard pivoted to said frame and movable therewith, means with which said guard is engageable to stop the movement of said guard with said frame and to cause a relative movement between the guard and frame about the pivots thereof, and means for effecting relative movement between said guard and frame to the opposite direction and about said pivots subsequent to the cutting operation.

5. In a fabric cutting machine, a table, a stationary cutting blade supported thereby, a frame pivoted to said table and having operating and return strokes, a cutting blade carried by said frame and cooperating with said stationary blade during the operating stroke of said frame, a guard pivoted to said frame and movable therewith during portions of said strokes, and means with which said guard is engageable during the operating stroke of said frame for effecting a relative movement between the guard and frame during the cutting operation.

6. In a fabric cutting machine, a table, a stationary cutting blade supported thereby, a frame pivoted to said table and having operating and return strokes, a cutting blade carried by said frame and cooperating with said stationary blade during the operating stroke of said frame, a guard pivoted to said frame and movable therewith during portions of said strokes, means with which said guard is engageable during the operating stroke of said frame for effecting a relative movement between the guard and frame during the cutting operation, and means connecting said frame and guard to effect a relative movement therebetween during the return stroke of said frame.

7. In a machine for cutting fabric, a table having a trough formed therein, a lubricating medium in said trough, a stationary cutting blade supported by said table, a frame pivoted to said table and having operating and return strokes, a cutting blade carried by said frame and cooperating with said stationary blade upon the operating stroke of said frame and engageable with said lubricating medium during the cutting operation, a guard pivoted to said frame and movable therewith during portions of said strokes, and means for effecting relative movements between said frame and guard during the remaining portions of said strokes.

FRANK S. WENIGER.